United States Patent
Kuriyama et al.

(10) Patent No.: US 9,683,173 B2
(45) Date of Patent: Jun. 20, 2017

(54) NEMATIC LIQUID CRYSTAL COMPOSITION AND LIQUID CRYSTAL DISPLAY ELEMENT USING SAME

(71) Applicant: DIC Corporation, Tokyo (JP)

(72) Inventors: Takeshi Kuriyama, Kita-adachi-gun (JP); Go Sudo, Kita-adachi-gun (JP); Shinichi Hirata, Kita-adachi-gun (JP); Shotaro Kawakami, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/366,562

(22) PCT Filed: Dec. 18, 2012

(86) PCT No.: PCT/JP2012/082779
§ 371 (c)(1),
(2) Date: Oct. 14, 2014

(87) PCT Pub. No.: WO2013/094596
PCT Pub. Date: Jun. 27, 2013

(65) Prior Publication Data
US 2015/0069296 A1 Mar. 12, 2015

(30) Foreign Application Priority Data
Dec. 21, 2011 (JP) ................. 2011-279696

(51) Int. Cl.
| G02F 1/1333 | (2006.01) |
| C09K 19/56 | (2006.01) |
| C09K 19/30 | (2006.01) |
| C09K 19/44 | (2006.01) |
| C09K 19/12 | (2006.01) |
| G02F 1/137 | (2006.01) |
| C09K 19/04 | (2006.01) |

(52) U.S. Cl.
CPC .......... C09K 19/56 (2013.01); C09K 19/3066 (2013.01); C09K 19/44 (2013.01); C09K 2019/0448 (2013.01); C09K 2019/122 (2013.01); C09K 2019/123 (2013.01); C09K 2019/3027 (2013.01); G02F 2001/13712 (2013.01)

(58) Field of Classification Search
CPC .... C09K 19/56; C09K 19/3066; C09K 19/44; C09K 2019/123; C09K 2019/0448; C09K 2019/122; C09K 2019/3027; G02F 1/1333; G02F 2001/13712
USPC .............. 252/299.01, 299.6, 299.63; 428/1.1
See application file for complete search history.

(56) References Cited

U.S. PATENT DOCUMENTS

| 5,599,480 | A | 2/1997 | Tarumi et al. |
| 8,399,073 | B2 * | 3/2013 | Klasen-Memmer C09K 19/3001 |
| | | | 252/299.61 |
| 8,535,768 | B2 * | 9/2013 | Saito ...................... C09K 19/12 |
| | | | 252/299.01 |
| 2003/0222245 | A1 | 12/2003 | Klasen-Memmer et al. |
| 2009/0090892 | A1 | 4/2009 | Fujita et al. |
| 2009/0206300 | A1 | 8/2009 | Satou et al. |
| 2011/0175027 | A1 | 7/2011 | Hattori et al. |
| 2011/0272631 | A1 | 11/2011 | Saito |
| 2012/0145959 | A1 | 6/2012 | Masukawa |
| 2012/0181478 | A1 | 7/2012 | Hattori et al. |
| 2012/0261614 | A1 | 10/2012 | Goto et al. |
| 2012/0292568 | A1 | 11/2012 | Kuriyama et al. |
| 2012/0292569 | A1 | 11/2012 | Kurisawa et al. |

FOREIGN PATENT DOCUMENTS

| JP | 08-104869 A | 4/1996 | |
| JP | 2003-327965 A | 11/2003 | |
| JP | 2011-144274 A | 7/2011 | |
| JP | 2012-241125 A | * 12/2012 | ............. C09K 19/54 |
| JP | 2012241124 A | 12/2012 | |
| JP | 2012241125 A | 12/2012 | |
| WO | 2007/077872 A1 | 7/2007 | |
| WO | 2010084823 A1 | 7/2010 | |
| WO | 2011/021525 A1 | 2/2011 | |
| WO | 2011/040170 A1 | 4/2011 | |
| WO | 2012/144321 A1 | 10/2012 | |

OTHER PUBLICATIONS

Extended European Search Report dated Oct. 9, 2015, issued in counterpart European Patent Application No. 12 359 890.1. (10 pages).
International Search Report dated Feb. 12, 2013, issued in International Patent Application No. PCT/JP2012/082779. (2 pages).

* cited by examiner

*Primary Examiner* — Geraldina Visconti
(74) *Attorney, Agent, or Firm* — Westerman, Hattori, Daniels & Adrian, LLP

(57) ABSTRACT

A liquid crystal composition of the present invention is used for a liquid crystal display device of an active matrix driving method, which requires fast response. The liquid crystal composition has negative dielectric anisotropy and a large absolute value thereof, and low viscosity. The liquid crystal composition is chemically stable to heat, light, water, and the like, and is suitable as a liquid crystal composition capable of low-voltage driving and practicable and having high reliability. A liquid crystal display device using the liquid crystal composition can be preferably used for a liquid crystal display device of a VA mode, a PASV mode, a PSA mode, or the like.

11 Claims, No Drawings

NEMATIC LIQUID CRYSTAL COMPOSITION AND LIQUID CRYSTAL DISPLAY ELEMENT USING SAME

TECHNICAL FIELD

The present invention relates to a nematic liquid crystal composition useful as a liquid crystal display material and exhibiting a negative value of dielectric anisotropy (Δ∈), and also relates to a liquid crystal display device using the composition.

BACKGROUND ART

Liquid crystal display devices have been used for watches and electronic calculators, various home electric appliances, measuring apparatuses, automotive panels, word processors, electronic notebooks, printers, computers, televisions, etc. Typical examples of a liquid crystal display mode include a TN (twisted nematic) mode, a STN (super twisted nematic) mode, a DS (dynamic light scattering) mode, a GH (guest-host) mode, an IPS (in-plane switching) mode, an OCB (optical compensated bend) mode, an ECB (electrically controlled birefringence) mode, a VA (vertical alignment) mode, a CSH (color super homeotropic) mode, and a FLC (ferromagnetic liquid crystal) mode, and the like. Also, driving methods include static driving, multiplex driving, a simple matrix method, and an active matrix (AM) method of driving by TFT (thin-film transistor), TFD (thin-film diode), or the like.

Among these display modes, the IPS mode, the ECB mode, the VA mode, or the CSH mode has the characteristic of using a liquid crystal material exhibiting a negative value of Δ∈. In particular, the VA display mode driven by AM driving is used for display devices, for example, a television and the like, which require a high speed and a wide viewing angle.

Nematic liquid crystal compositions used for the VA display mode and the like are required to have low-voltage driving, fast response, and a wide operating temperature range. That is, the liquid crystal compositions are required to have a large absolute value of negative Δ∈, low viscosity, and a high nematic-isotropic liquid phase transition temperature ($T_{ni}$). Also, in view of setting of Δn×d which is the product of refractive index anisotropy (Δn) and a cell gap (d), it is necessary to adjust Δn of a liquid crystal composition within a proper range according to the cell gap. In addition, when a liquid crystal display device is applied to a television or the like, fast response is regarded as important, and thus a liquid crystal material having low viscosity (η) is required.

The characteristics of liquid crystal compositions have been improved by studying various compounds having negative Δ∈ and a large absolute value thereof.

A liquid crystal composition containing liquid crystal compounds (A) and (B) below (refer to Patent Literature 1) having a 2,3-difluorophenylene skeleton is disclosed as a liquid crystal material having negative Δ∈.

[Chem. 1]

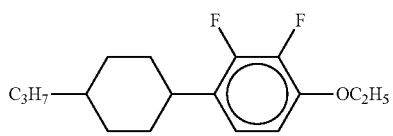
(A)

-continued

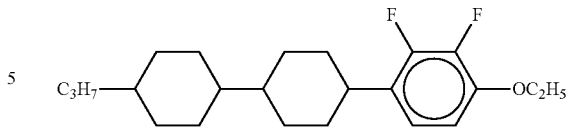
(B)

The liquid crystal composition contains liquid crystal compounds (C) and (D) as compounds having Δ∈ of substantially zero, but with the liquid crystal composition, satisfactorily low viscosity is not realized for a liquid crystal composition for a liquid crystal television and the like, which require fast response.

[Chem. 2]

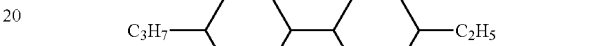
(C)

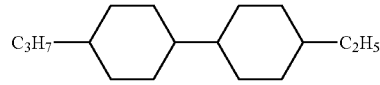
(D)

On the other hand, Patent Literature 2 and Patent Literature 3 already disclose liquid crystal compositions each containing a compound having a fluorine-substituted terphenyl structure, but faster response performance than the current response is required for complying with speedy images and 3D images. In addition, an increase in Δn is advanced in liquid crystal compositions used for narrow-cell applicable products for improvement in response. However, the problem of solubility at a low temperature also occurs, and there is demand for a liquid crystal composition satisfying both low viscosity for fast response and solubility with which a liquid crystal phase is stably maintained even at a low temperature.

CITATION LIST

Patent Literature

PTL 1: Japanese Unexamined Patent Application Publication No. 8-104869
PTL 2: Japanese Unexamined Patent Application Publication No. 2003-327965
PTL 3: WO2007/077872

SUMMARY OF INVENTION

Technical Problem

A problem to be solved by the invention is to provide a liquid crystal composition having a liquid crystal phase over a wide temperature range, low viscosity, negative Δ∈ and a large absolute value thereof, and good solubility at a low temperature, and further provide a liquid crystal display device of a VA mode, a PSVA mode, or the like which uses the liquid crystal composition and has good display quality.

Solution to Problem

As a result of research on various liquid crystal compounds, the inventors found that the problem can be solved by combining specified compounds, leading to the achievement of the present invention.

The present invention provides a liquid crystal composition containing as a first component one or two or more compounds selected from a compound group represented by general formula (I),

[Chem. 3]

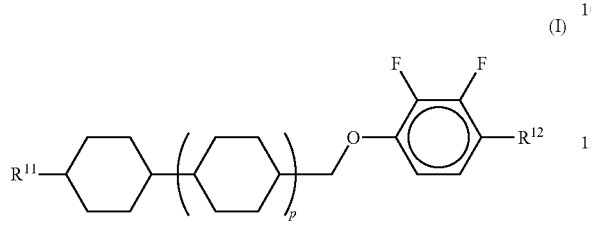

(I)

(in the formula, $R^{11}$ and $R^{12}$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —$CH_2$— or two or more nonadjacent —$CH_2$— present in $R^{11}$ and $R^{12}$ may be each independently substituted by —O— and/or —S—, one or two or more hydrogen atoms present in $R^{11}$ and $R^{12}$ may be each independently substituted by a fluorine atom or a chlorine atom, and p represents 0 or 1), and as a second component one or two or more compounds selected from a compound group represented by general formula (II),

[Chem. 4]

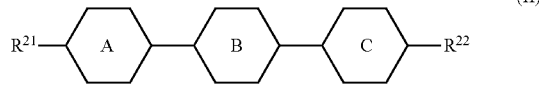

(II)

(in the formula, $R^{21}$ and $R^{22}$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —$CH_2$— or two or more nonadjacent —$CH_2$— present in $R^{11}$ and $R^{12}$ may be each independently substituted by —O—and/or —S—, one or two or more hydrogen atoms present in $R^{21}$ and $R^{22}$ may be each independently substituted by a fluorine atom or a chlorine atom, ring A, ring B, and ring C each independently represent a 1,4-phenylene group, a 2-fluoro-1,4-phenylene group, a 3-fluoro-1,4-phenylene group, or a 2,3-difluoro-1,4-phenylene group, and at least one of the rings represents a 2,3-difluoro-1,4-phenylene group), and further provides a liquid crystal display device using the liquid crystal composition.

Advantageous Effects of Invention

A liquid crystal composition having negative $\Delta \in$ according to the present invention can have satisfactorily low viscosity and good solubility at a low temperature, and thus has high practicability of products, and a liquid crystal display device of a VA mode, a PSVA mode, or the like using the liquid crystal composition can achieve fast response and suppress display defects, and is thus very useful.

DESCRIPTION OF EMBODIMENTS

In a liquid crystal composition according to the present invention, in a compound contained as a first component and represented by general formula (I),

[Chem. 5]

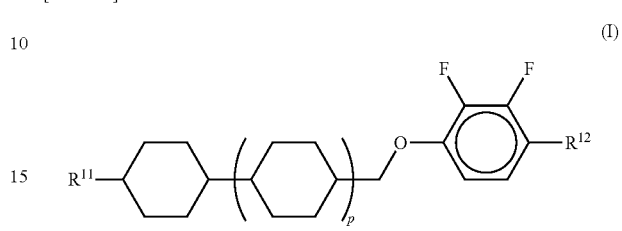

(I)

$R^{11}$ and $R^{12}$ preferably each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms (including a compound in which one —$CH_2$— or two or more nonadjacent —$CH_2$— present in these groups are substituted by —O— and/or —S— or one or two or more hydrogen atoms present in these groups are substituted by a fluorine atom or a chlorine atom), more preferably each independently represent a linear alkyl group having 1 to 10 carbon atoms, a linear alkoxyl group having 1 to 10 carbon atoms, or an alkenyl group having 2 to 10 carbon atoms, and particularly preferably each independently represent a linear alkyl group having 1 to 8 carbon atoms or an alkoxyl group having 1 to 8 carbon atoms, and p represents 0 or 1. The liquid crystal composition of the present invention contains one or two compounds represented by the general formula (I) and preferably contains one to five compounds, and the content thereof is preferably 5 to 70% by mass and more preferably 5 to 60% by mass.

In a compound contained as a second component and represented by general formula (II),

[Chem. 6]

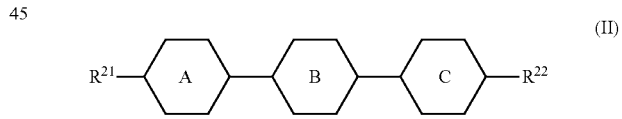

(II)

$R^{21}$ and $R^{22}$ preferably each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms (including a compound in which one —$CH_2$— or two or more nonadjacent —$CH_2$— present in these groups are substituted by —O— and/or —S— or one or two or more hydrogen atoms present in these groups are substituted by a fluorine atom or a chlorine atom), more preferably each independently represent a linear alkyl group having 1 to 10 carbon atoms, a linear alkoxy group having 1 to 10 carbon atoms, or an alkenyl group having 2 to 10 carbon atoms, and particularly preferably each independently represent a linear alkyl group having 1 to 8 carbon atoms or an alkoxyl group having 1 to 8 carbon atoms, ring A, ring B, and ring C each independently represent a 1,4-phenylene group, a 2-fluoro-1,4-phenylene group, a 3-fluoro-1,4-phenylene group, or a 2,3-difluoro-1,4-phenylene group, and at least one of the rings represents a 2,3-difluoro-1,4-phenylene group.

More specifically, preferred examples of the compound represented by the general formula (II) include compounds represented by general formula (II-A) to general formula (II-H) below.

[Chem. 7]

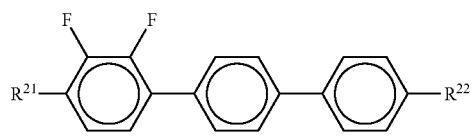

(II-A)

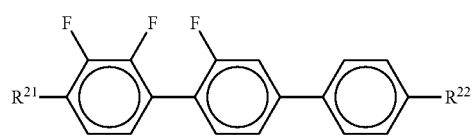

(II-B)

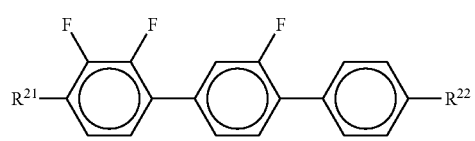

(II-C)

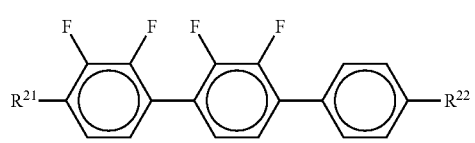

(II-D)

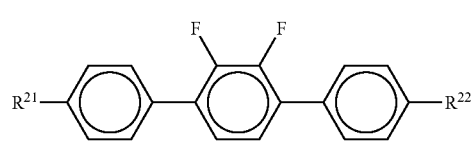

(II-E)

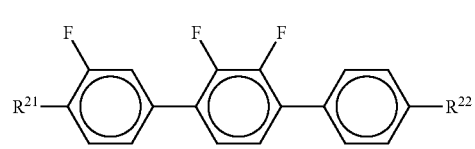

(II-F)

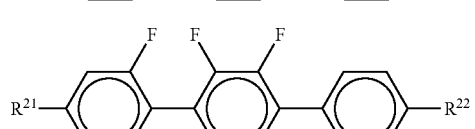

(II-G)

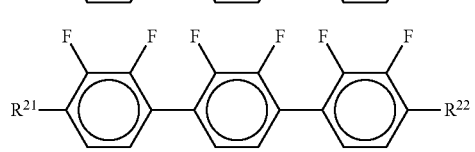

(II-H)

(In the formulae, $R^{21}$ and $R^{22}$ preferably each independently represent an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, one —$CH_2$— or two or more nonadjacent —$CH_2$— present in $R^{11}$ and $R^{12}$ may be each independently substituted by —O— and/or —S—, and one or two or more hydrogen atoms present in $R^{21}$ and $R^{22}$ may be each independently substituted by a fluorine atom or a chlorine atom.)

Among the compounds represented by the general formula (II-A) to the general formula (II-H), the general formula (II-A), the general formula (II-B), the general formula (II-C), the general formula (II-E), the general formula (II-F), and the general formula (II-G) are more preferred.

The present invention contains at least one compound represented by the general formula (II), preferably contains one to ten compounds, and particularly preferably contains one to eight compounds, and the content thereof is preferably 2 to 30% by mass and more preferably 2 to 20% by mass.

The liquid crystal composition of the present invention may further contain, as a third component, one or two or more compounds selected from a compound group represented by general formula (III-A) to general formula (III-J),

[Chem. 8]

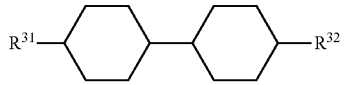

(III-A)

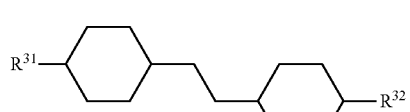

(III-B)

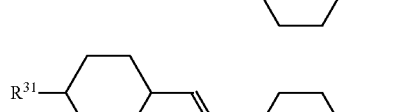

(III-C)

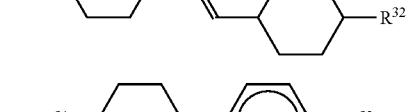

(III-D)

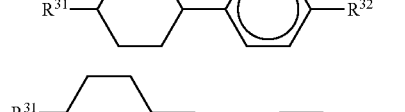

(III-E)

(III-F)

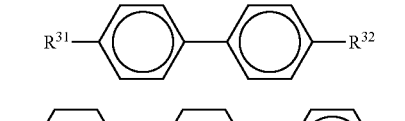

(III-G)

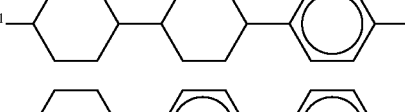

(III-H)

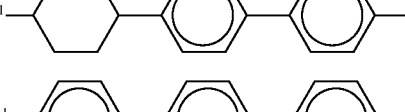

(III-I)

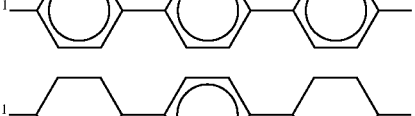

(III-J)

and more preferably contains two to ten compounds selected from the general formulae (III-A), (III-D), (III-F), (III-G), and (III-H). $R^{31}$ and $R^{32}$ preferably each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, preferably each independently represent an alkyl group having 1 to 10 carbon atoms, an alkoxyl group having 1 to 10 carbon atoms, or an alkenyl group having 2 to 10 carbon atoms, and more preferably each independently represent an alkyl group having 1 to 5 carbon atoms, an alkoxyl group having 1 to 5 carbon atoms, or an alkenyl group having 2 to 5 carbon atoms.

In the present invention, the content of the compound represented by the general formula (III) is preferably 10% to 90% by mass, more preferably 20% to 80% by mass, still more preferably 25% to 70% by mass, and particularly preferably 30% to 65% by mass.

The liquid crystal composition of the present invention preferably simultaneously contains the compound represented by the general formula (I), the compound represented by the general formula (II), and the compound selected from the compound group represented by the general formula (III-A) to the general formula (III-J), and more preferably simultaneously contains the compound represented by the general formula (I), the compound represented by the general formula (II), and the compound represented by the general formula (III-A).

The liquid crystal composition of the present invention preferably has a Δ∈ at 25° C. of −2.0 to −6.0, more preferably −2.5 to −5.5, and particularly preferably −2.5 to −5.0. In addition, Δn at 25° C. is preferably 0.08 to 0.13, more preferably 0.09 to 0.13, and particularly preferably 0.09 to 0.12. In further detail, in correspondence to a thin cell gap, Δn at 25° C. is preferably 0.10 to 0.13, while in correspondence to a thick cell gap, Δn at 25° C. is preferably 0.08 to 0.10. Further, η at 20° C. is preferably 10 to 30 mPa·s, more preferably 10 to 25 mPa·s, and particularly preferably 10 to 20 mPa·s, and $T_{ni}$ is preferably 60° C. to 120° C., more preferably 70° C. to 100° C., and particularly preferably 70° C. to 85° C.

Besides the above-described compounds, the liquid crystal composition of the present invention may further contain a usual nematic liquid crystal, smectic liquid crystal, cholesteric liquid crystal, antioxidant, ultraviolet absorber, and polymerizable monomer.

In order to improve storage stability, a stabilizer can also be added to the liquid crystal composition of the present invention. Examples of the stabilizer which can be used include hydroquinones, hydroquinone monoalkyl ethers, tertiary butyl catechols, pyrogallols, thiophenols, nitro-compounds, β-naphthylamines, β-naphthols, nitroso-compounds, and the like.

The liquid crystal composition of the present invention can contain a polymerizable compound for manufacturing a PS-mode, PSA-mode, or PSVA-mode liquid crystal display device. Examples of the polymerizable compound which can be used include photopolymerizable monomers subjected to polymerization which proceeds with energy rays such as light, and polymerizable compounds having as a structure a liquid crystal skeleton in which a plurality of six-member rings are connected to each other, for example, a biphenyl derivative, a terphenyl derivative, or the like. More specifically, a compound represented by general formula (IV) is preferred,

[Chem. 9]

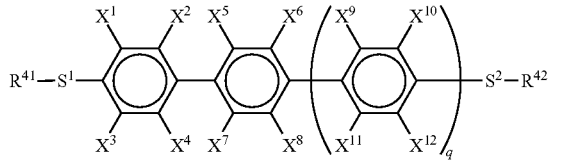

(IV)

(in the formula, $R^{41}$ and $R^{42}$ each independently represent any one of formula (R-1) to formula (R-15) below,

[Chem. 10]

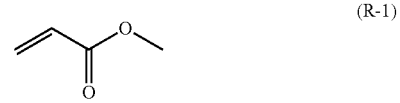

(R-1)

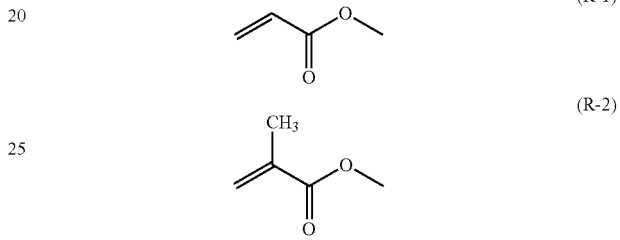

(R-2)

(R-3)

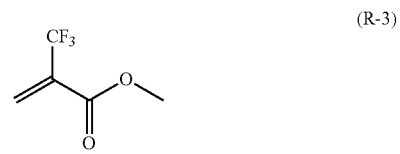

(R-4)

(R-5)

(R-6)

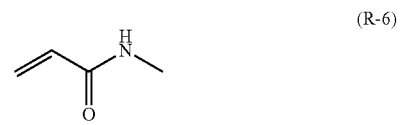

(R-7)

(R-8)

(R-9)

(R-10)

(R-11)

(R-12)

-continued

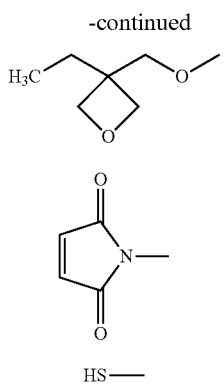

$X^1$ to $X^{12}$ each independently represent a trifluoromethyl group, a trifluoromethoxy group, a fluorine atom, a hydrogen atom, or an alkyl group having 1 to 3 carbon atoms, $S^1$ and $S^2$ each independently represent an alkylene group having 1 to 8 carbon atoms or a single bond, one —$CH_2$— or two or more nonadjacent —$CH_2$— in the alkylene group may be substituted by —O—, —COO—, —COO—, or —OCOO—, and q represents 0 or 1).

Further, in the compound, $R^{41}$ and $R^{42}$ preferably each independently represent the formula (R-1) or (R-2), $X^1$ to $X^{12}$ preferably each independently represent a fluorine atom, a hydrogen atom, or a methyl group, and $S^1$ and $S^2$ preferably each independently represent an alkylene group having 1 to 4 carbon atoms, an alkoxylene group, or a single bond, and more preferably a single bond.

One or two or more polymerizable compounds are preferably contained, and the content thereof is preferably 0.01% by mass to 2% by mass.

In the liquid crystal composition of the present invention containing the polymerizable compound, polymerization proceeds even in the absence of a polymerization initiator, but the liquid crystal composition may contain a polymerization initiator for promoting polymerization. Examples of the polymerization initiator include benzoin ethers, benzophenones, acetophenones, benzylketals, acylphosphine oxides, and the like.

A liquid crystal display device using the liquid crystal composition of the present invention satisfies both fast response and the suppression of display defects and is useful, and particularly useful for a liquid crystal display device for active matrix driving, and can be applied to a VA mode, a PSVA mode, a PSA mode, an IPS mode, or an ECB mode.

EXAMPLES

The present invention is described in further detail below by way of examples, but the present invention is not limited to these examples. In the examples and comparative examples below, "%" in a composition represents "% by mass".

The characteristics measured in the examples are as follows.

$T_{ni}$: nematic-isotropic liquid phase transition temperature (° C.)

Δn: refractive index anisotropy at 25° C.

Δ∈: dielectric anisotropy at 25° C.

η: viscosity at 20° C. (mPa·s)

Example 1

A liquid crystal composition prepared and the physical property values thereof are described below.

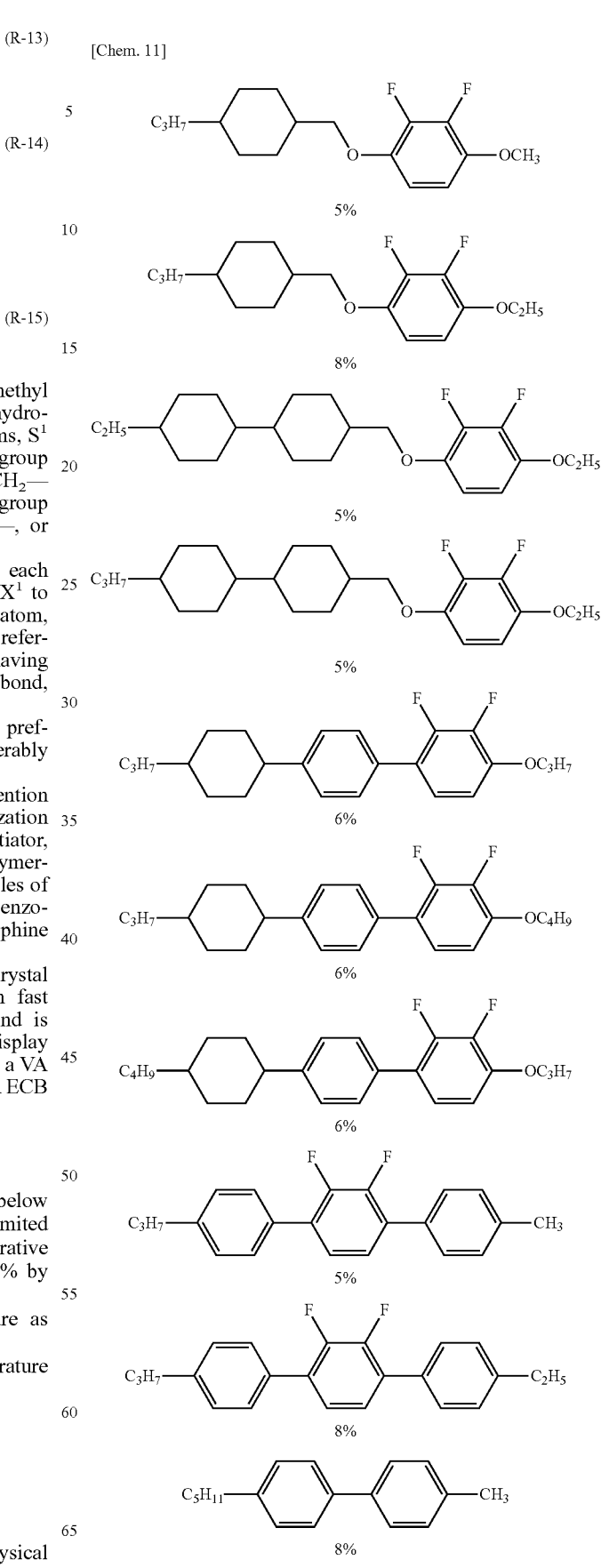

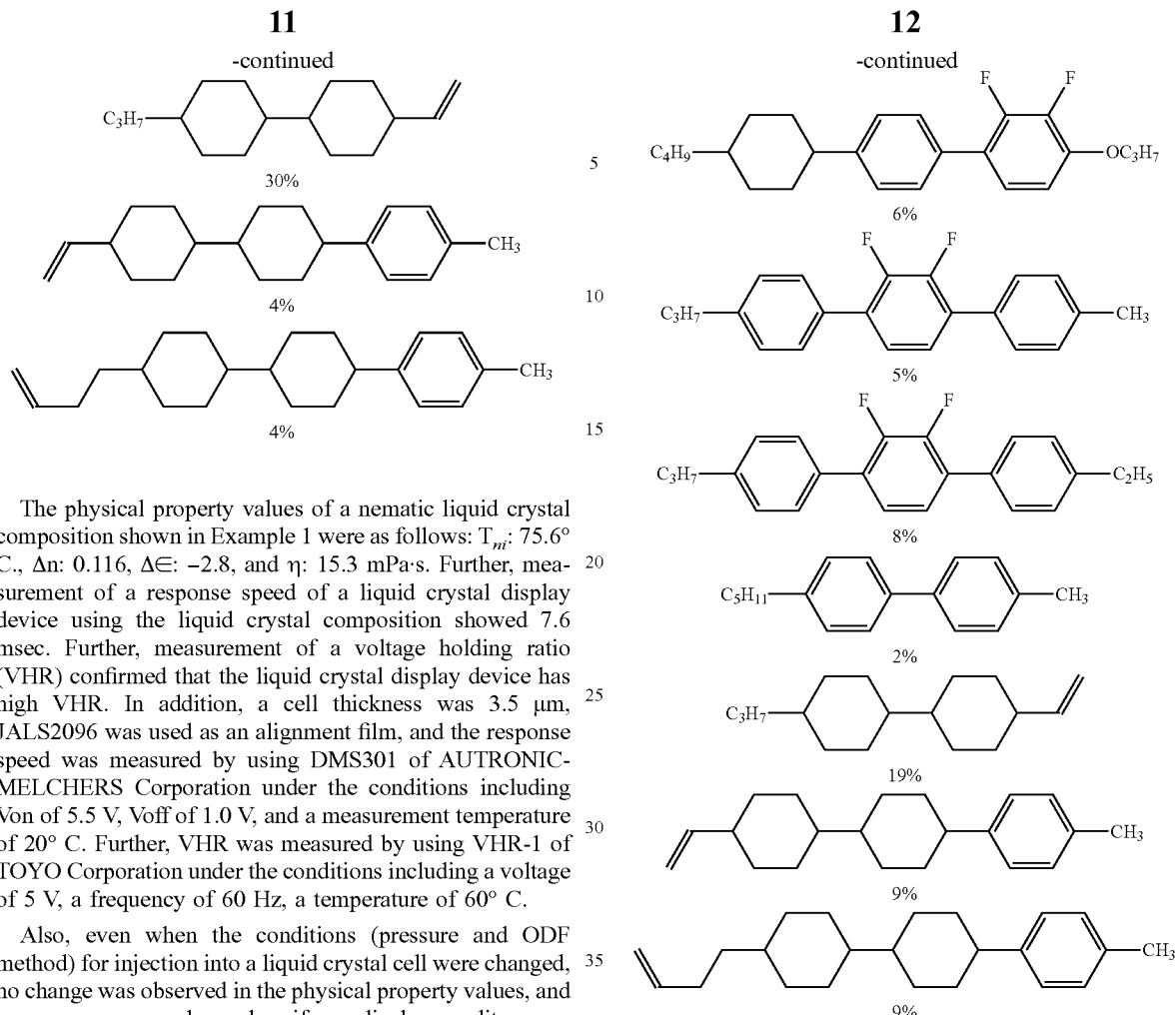

The physical property values of a nematic liquid crystal composition shown in Example 1 were as follows: $T_{ni}$: 75.6° C., Δn: 0.116, Δ∈: −2.8, and η: 15.3 mPa·s. Further, measurement of a response speed of a liquid crystal display device using the liquid crystal composition showed 7.6 msec. Further, measurement of a voltage holding ratio (VHR) confirmed that the liquid crystal display device has high VHR. In addition, a cell thickness was 3.5 μm, JALS2096 was used as an alignment film, and the response speed was measured by using DMS301 of AUTRONIC-MELCHERS Corporation under the conditions including Von of 5.5 V, Voff of 1.0 V, and a measurement temperature of 20° C. Further, VHR was measured by using VHR-1 of TOYO Corporation under the conditions including a voltage of 5 V, a frequency of 60 Hz, a temperature of 60° C.

Also, even when the conditions (pressure and ODF method) for injection into a liquid crystal cell were changed, no change was observed in the physical property values, and no unevenness and good uniform display quality were exhibited.

Comparative Example 1

A liquid crystal composition prepared and the physical property values thereof are described below.

[Chem. 12]

A nematic liquid crystal composition shown in Comparative Example 1 did not contain the formula (I) of the present invention and showed $T_{ni}$: 76.0° C., Δn: 0.117, Δ∈: −2.9, and η: 18.5 mPa·s. When $T_{ni}$, Δn, and Δ∈ were adjusted to the same as in Example 1 without using a compound represented by the general formula (I), viscosity was increased as compared with Example 1. In addition, measurement of a response speed of a liquid crystal display device using the liquid crystal composition showed 10.1 msec.

Comparative Example 2

Although an example of a liquid crystal composition not containing a compound represented by the formula (I) is shown in Comparative Example 1, a liquid crystal composition not containing a compound represented by the general formula (II) was prepared.

[Chem. 13]

-continued

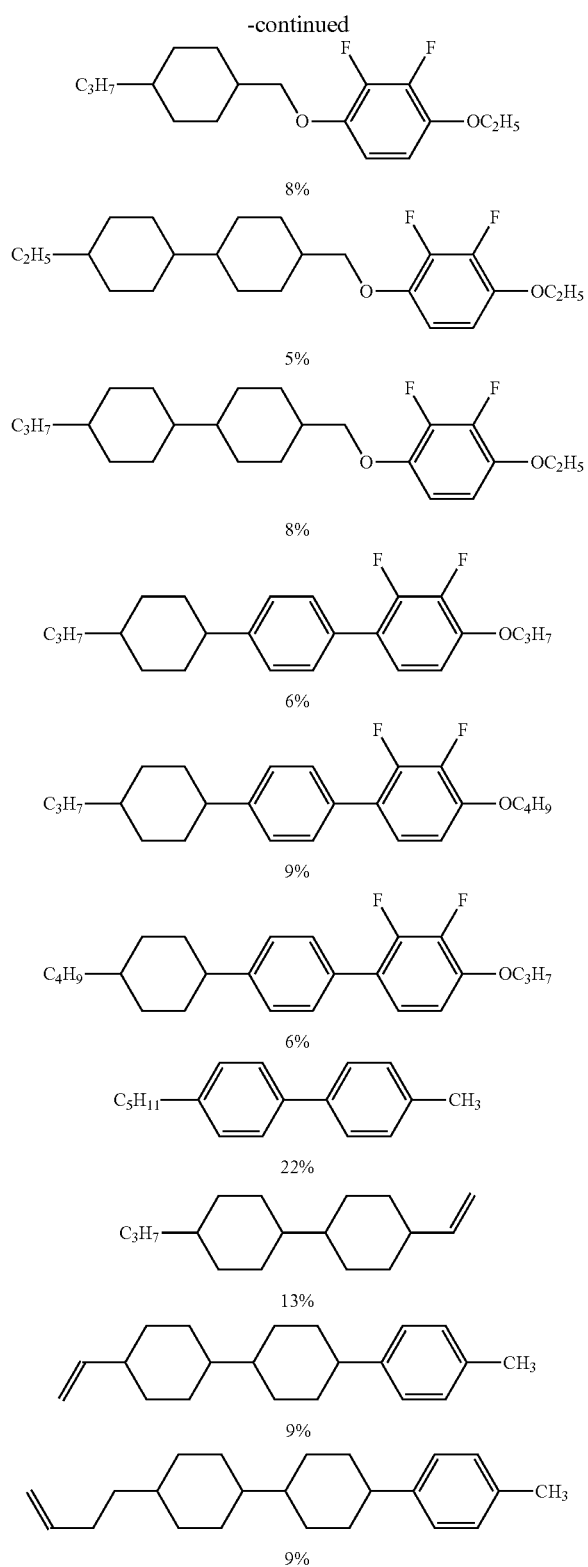

8%

5%

8%

6%

9%

6%

22%

13%

9%

9%

The physical property values thereof were as follows: $T_{ni}$: 76.3° C., $\Delta n$: 0.119, $\Delta\in$: −2.8, and $\eta$: 17.8 mPa·s. When $T_{ni}$, $\Delta n$, and $\Delta\in$ were adjusted to the same as in Example 1 without using a compound represented by the general formula (II), viscosity was increased as compared with Example 1.

Therefore, it was found that as in the present invention, a liquid crystal composition containing compounds represented by the general formula (I) and the general formula (II) can be improved in $\eta$.

Further, as a result of low-temperature storage test of Example 1, Comparative Example 1, and Comparative Example 2, Examples 1 maintained a nematic state for 2 weeks at −30° C. and −20° C., while Comparative Example 1 and Comparative Example 2 maintained a nematic state for only 1 week, and precipitates were observed at the second week. This confirmed that Example 1 maintains a nematic state over a wide temperature range and is thus a very practical liquid crystal composition for use.

Example 2

A liquid crystal composition prepared and the physical property values thereof are described below.

[Chem. 14]

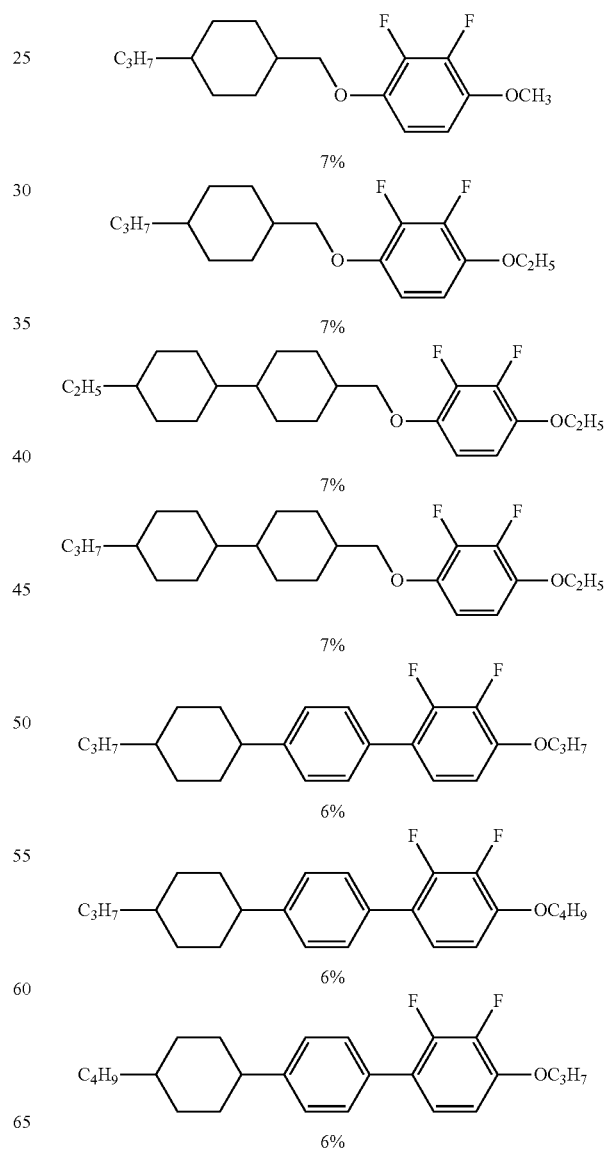

7%

7%

7%

7%

6%

6%

6%

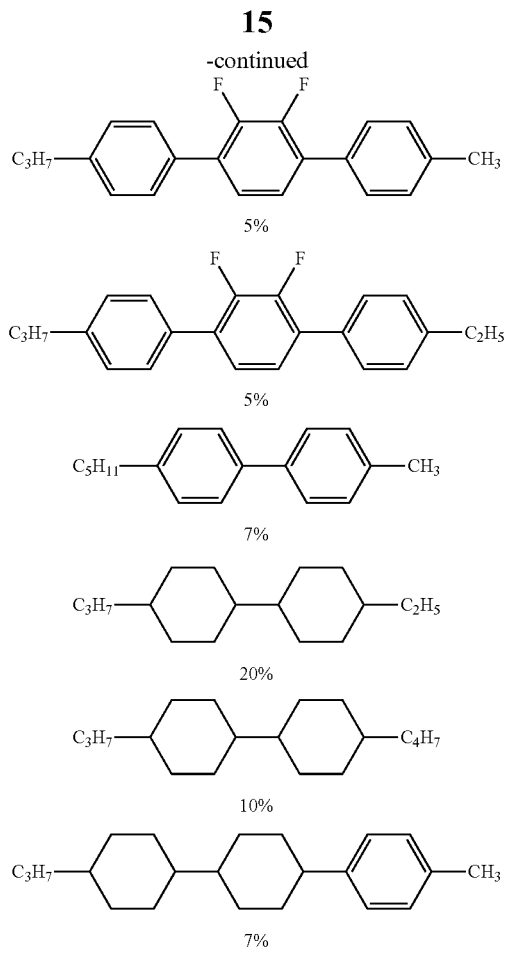

The physical property values of a nematic liquid crystal composition shown in Example 2 were as follows: $T_{ni}$: 78.1° C., Δn: 0.104, Δ∈: −2.9, and η: 15.5 mPa·s. The liquid crystal composition maintained a nematic state for 2 weeks at −30° C. and −20° C. This confirmed that the liquid crystal composition maintains a nematic state over a wide temperature range and is thus a very practical liquid crystal composition for use.

Example 3

A liquid crystal composition prepared and the physical property values thereof are described below.

[Chem. 15]

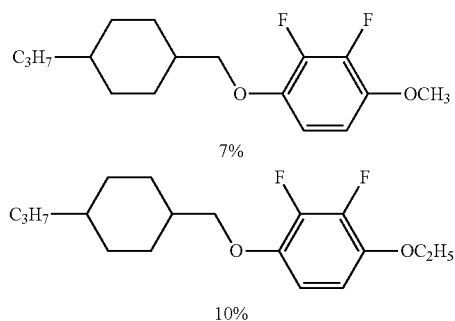

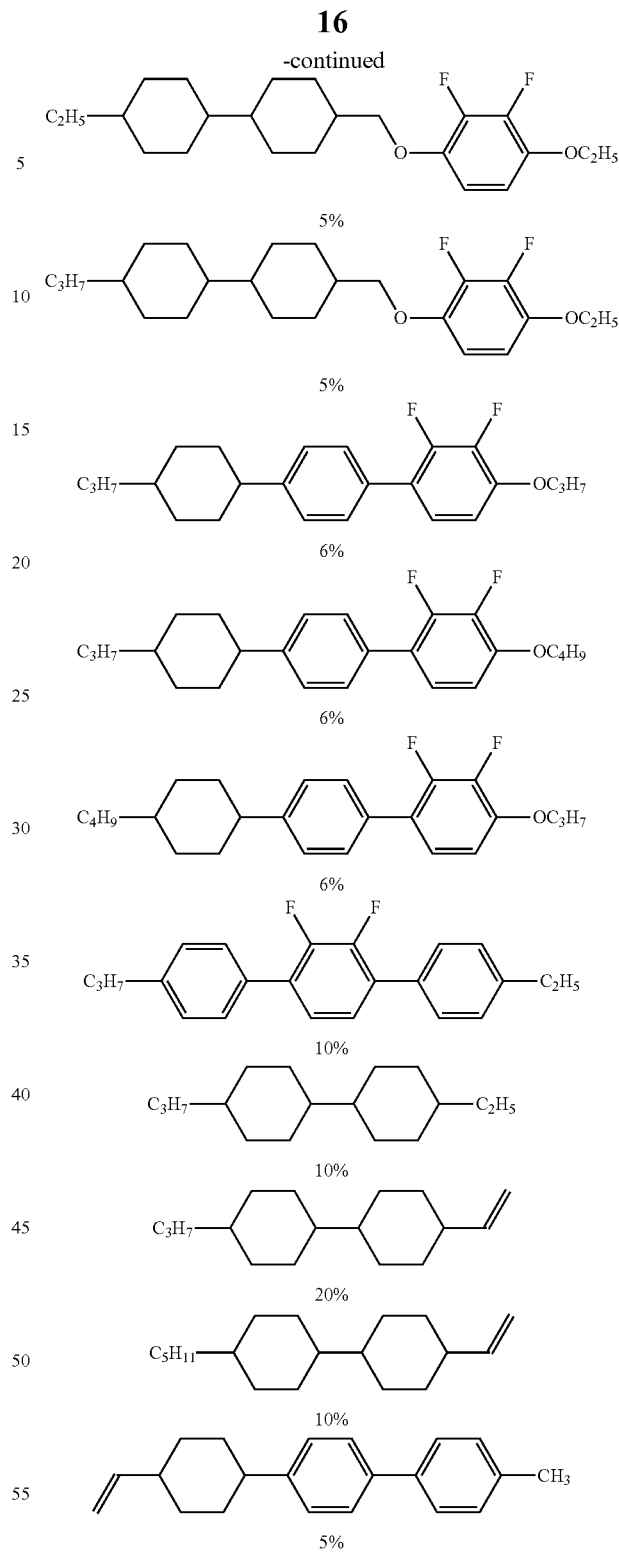

The physical property values of a nematic liquid crystal composition shown in Example 3 were as follows: $T_{ni}$: 76.9° C., Δn: 0.098, Δ∈: −3.0, and 14.7 mPa·s. The liquid crystal composition maintained a nematic state for 2 weeks at −30° C. and −20° C. This confirmed that the liquid crystal composition maintains a nematic state over a wide temperature range and is thus a very practical liquid crystal composition for use.

Example 4

A liquid crystal composition prepared and the physical property values thereof are described below.

[Chem. 16]

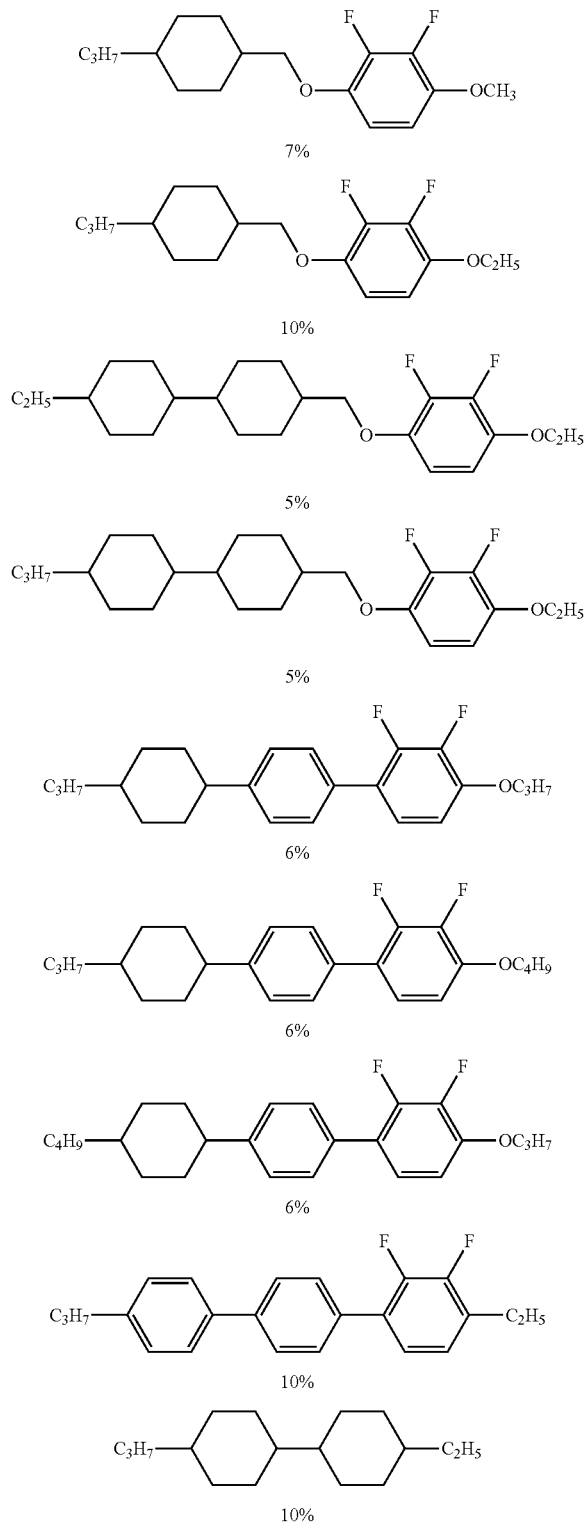

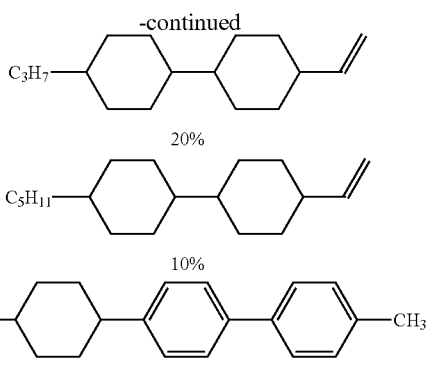

The physical property values of a nematic liquid crystal composition shown in Example 4 were as follows: $T_{ni}$: 77.4° C., $\Delta n$: 0.100, $\Delta \varepsilon$: −2.9, and 14.9 mPa·s. The liquid crystal composition maintained a nematic state for 2 weeks at −30° C. and −20° C. This confirmed that the liquid crystal composition maintains a nematic state over a wide temperature range and is thus a very practical liquid crystal composition for use.

Example 5

A polymerizable liquid crystal composition CLC-1 was prepared by adding and uniformly dissolving 0.3% of a polymerizable compound represented by formula (IV-a) to 99.7% of the nematic liquid crystal composition shown in Example 1.

[Chem. 17]

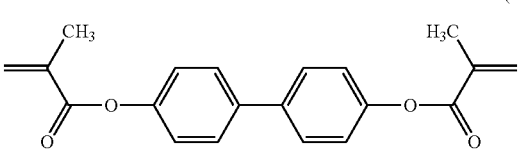

(IV-a)

The physical properties of CLC-1 were substantially the same as those of the nematic liquid crystal composition shown in Example 1. The CLC-1 was injected, by a vacuum injection method, into a cell provided with ITO and having a cell gap of 3.5 μm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm², thereby producing a vertical alignment liquid crystal display device. It was confirmed that an alignment regulating force is exerted on the liquid crystal compound by polymerizing the polymerizable compound. Also, it was confirmed that the vertical alignment liquid crystal display device has excellent optical properties and fast response.

The polymerizable liquid crystal composition maintained a nematic state for 2 weeks at −30° C. and −20° C. This confirmed that the liquid crystal composition maintains a nematic state over a wide temperature range and is thus a very practical liquid crystal composition for use.

Example 6

A polymerizable liquid crystal composition CLC-2 was prepared by adding and uniformly dissolving 0.3% of a polymerizable compound represented by formula (IV-b) to 99.7% of the nematic liquid crystal composition shown in Example 2.

[Chem. 18]

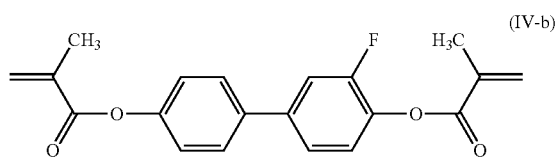

(IV-b)

The physical properties of CLC-2 were substantially the same as those of the nematic liquid crystal composition shown in Example 1. The CLC-2 was injected, by a vacuum injection method, into a cell provided with ITO and having a cell gap of 3.5 µm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm$^2$, thereby producing a vertical alignment liquid crystal display device. It was confirmed that an alignment regulating force is exerted on the liquid crystal compound by polymerizing the polymerizable compound. Also, it was confirmed that the vertical alignment liquid crystal display device has excellent optical properties and fast response.

The polymerizable liquid crystal composition maintained a nematic state for 2 weeks at −30° C. and −20° C. This confirmed that the liquid crystal composition maintains a nematic state over a wide temperature range and is thus a very practical liquid crystal composition for use.

Example 7

A polymerizable liquid crystal composition CLC-3 was prepared by adding and uniformly dissolving 0.3% of a polymerizable compound represented by formula (IV-c) to 99.7% of the nematic liquid crystal composition shown in Example 2.

[Chem. 19]

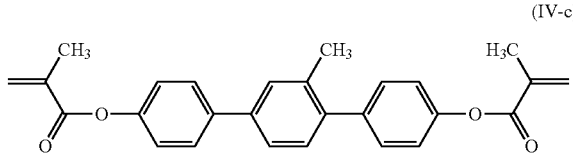

(IV-c)

The physical properties of CLC-3 were substantially the same as those of the nematic liquid crystal composition shown in Example 1. The CLC-3 was injected, by a vacuum injection method, into a cell provided with ITO and having a cell gap of 3.5 µm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm$^2$, thereby producing a vertical alignment liquid crystal display device. It was confirmed that an alignment regulating force is exerted on the liquid crystal compound by polymerizing the polymerizable compound. Also, it was confirmed that the vertical alignment liquid crystal display device has excellent optical properties and fast response.

The polymerizable liquid crystal composition maintained a nematic state for 2 weeks at −30° C. and −20° C. This confirmed that the liquid crystal composition maintains a nematic state over a wide temperature range and is thus a very practical liquid crystal composition for use.

Example 8

A polymerizable liquid crystal composition CLC-3 was prepared by adding and uniformly dissolving 0.3% of a polymerizable compound represented by formula (IV-d) to 99.7% of the nematic liquid crystal composition shown in Example 2.

[Chem. 20]

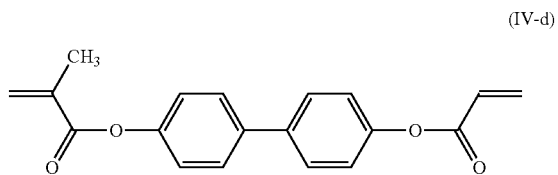

(IV-d)

The physical properties of CLC-3 were substantially the same as those of the nematic liquid crystal composition shown in Example 1. The CLC-3 was injected, by a vacuum injection method, into a cell provided with ITO and having a cell gap of 3.5 µm and a polyimide alignment film applied for inducing homeotropic alignment. A pre-tilt angle (crystal rotation method) of the cell was measured, and then the liquid crystal cell was irradiated with ultraviolet light from a high-pressure mercury lamp through a filter which cut off ultraviolet light of 320 nm or less, while a rectangular wave with a frequency of 1 kHz and 1.8 V was applied. The polymerizable compound in the polymerizable liquid crystal composition was polymerized by ultraviolet irradiation for 600 seconds so that the irradiation intensity on a surface of the cell was adjusted to 10 mW/cm$^2$, thereby producing a vertical alignment liquid crystal display device. It was confirmed that an alignment regulating force is exerted on the liquid crystal compound by polymerizing the polymerizable compound. Also, it was confirmed that the vertical alignment liquid crystal display device has excellent optical properties and fast response.

The polymerizable liquid crystal composition maintained a nematic state for 2 weeks at −30° C. and −20° C. This confirmed that the liquid crystal composition maintains a nematic state over a wide temperature range and is thus a very practical liquid crystal composition for use.

The invention claimed is:

1. A liquid crystal composition comprising;
as a first component, one or two or more compounds selected from a compound group represented by general formula (I),

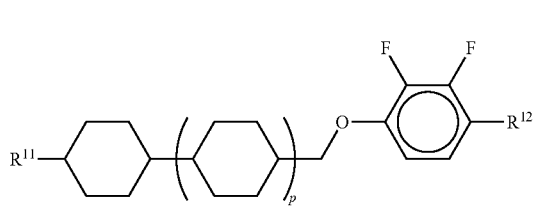

(I)

where $R^{11}$ and $R^{12}$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or two or more nonadjacent —CH$_2$— present in $R^{11}$ and $R^{12}$ may be each independently substituted by —O— and/or —S—, one or two or more hydrogen atoms present in $R^{11}$ and $R^{12}$ may be independently substituted by a fluorine atom or a chlorine atom, and p represents 0 or 1; and
as a second component, a compound group represented by general formula (II-E):

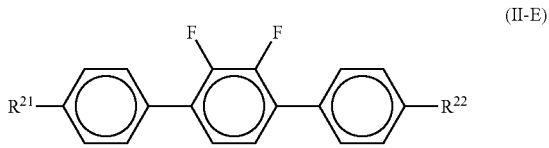

(II-E)

where $R^{21}$ and $R^{22}$ each independently represent an alkyl group having 1 to 10 carbon atoms, or an alkenyl group having 2 to 10 carbon atoms, and one or two or more hydrogen atoms present in $R^{21}$ and $R^{22}$ may be each independently substituted by a fluorine atom or a chlorine atom,
as a third component, a compounds represented by general formula (III-H),

(III-H)

where $R^{31}$ and $R^{32}$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms.

2. The liquid crystal composition according to claim 1, wherein as the second component, the liquid crystal composition further comprises one or two or more compounds selected from a compound group represented by general formula (II-A) to general formula (II-D), and general formula (II-F) to general formula (II-H),

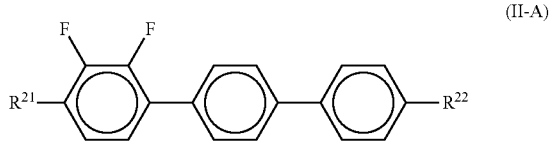

(II-A)

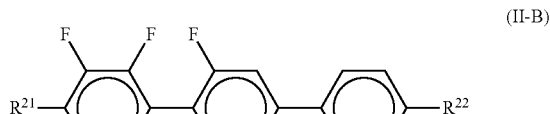

(II-B)

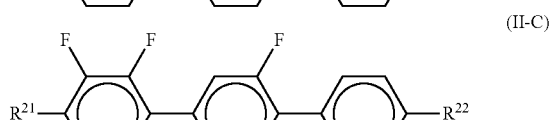

(II-C)

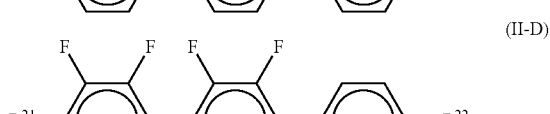

(II-D)

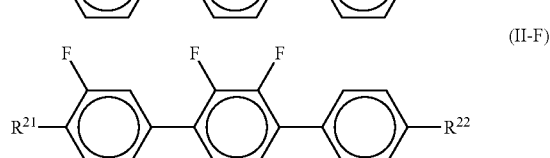

(II-F)

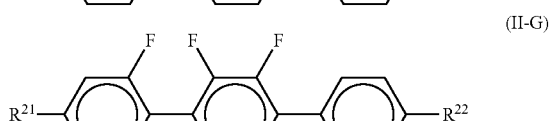

(II-G)

(II-H)

where $R^{21}$ and $R^{22}$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms, one —CH$_2$— or two or more nonadjacent —CH$_2$—present in $R^{11}$ and $R^{12}$ may be each independently substituted by —O— and/or —S—, and one or two or more hydrogen atoms present in $R^{21}$ and $R^{22}$ may be each independently substituted by a fluorine atom or a chlorine atom.

3. The liquid crystal composition according to claim 1, wherein the content of the first component is 5% to 60% by mass, and the content of the second component is 2% to 30% by mass.

4. The liquid crystal composition according to claim 1, wherein as the third component, the liquid crystal composition further comprises one or two or more compounds selected from a compound group represented by general formula (III-A) to general formula (III-G), and general formula (III-I) and general formula (III-J),

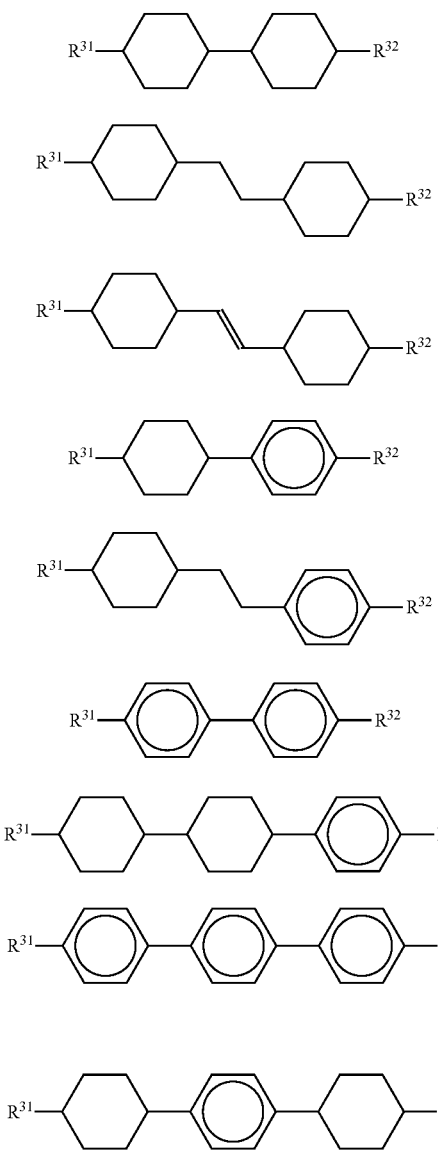

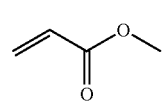

where R⁴¹ and R⁴² each independently represent any one of formula (R-1) to formula (R-15) below,

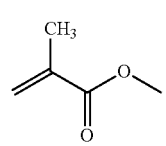

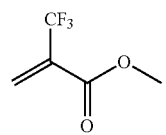

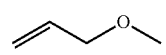

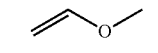

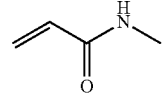

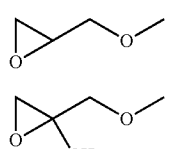

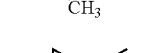

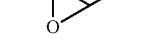

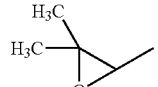

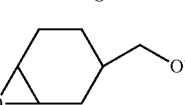

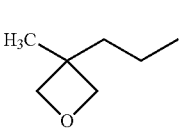

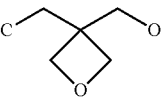

where $R^{31}$ and $R^{32}$ each independently represent an alkyl group having 1 to 10 carbon atoms, an alkoxyl group having 1 to 10 carbon atoms, an alkenyl group having 2 to 10 carbon atoms, or an alkenyloxy group having 2 to 10 carbon atoms.

5. The liquid crystal composition according to claim 1, wherein the content of the third component is 10% to 90% by mass.

6. The liquid crystal composition according to claim 1, wherein dielectric anisotropy Δ∈ at 25° C. is within a range of −2.0 to −6.0, refractive index anisotropy Δn at 25° C. is within a range of 0.08 to 0.13, and a nematic-isotropic liquid phase transition temperature (Tni) is within a range of 60° C. to 120° C.

7. The liquid crystal composition according to claim 1, comprising a polymerizable compound.

8. The liquid crystal composition according to claim 7, wherein the polymerizable compound is a compound represented by general formula (IV),

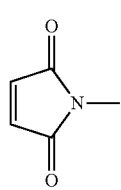

(R-14)

(R-15)
HS—

$X^1$ to $X^{12}$ each independently represent a trifluoromethyl group, a trifluoromethoxy group, a fluorine atom, a hydrogen atom, or an alkyl group having 1 to 3 carbon atoms, and q represents 0 or 1.

9. A liquid crystal display device comprising the liquid crystal composition according to claim 1.

10. A liquid crystal display device for active matrix driving, comprising the liquid crystal composition according to claim 1.

11. A liquid crystal display device for a VA mode, a PSA mode, a PSVA mode, an IPS mode, or an ECB mode, the liquid crystal display device comprising the liquid crystal composition according to claim 1.

* * * * *